US008127163B2

(12) United States Patent
Walczak

(10) Patent No.: US 8,127,163 B2
(45) Date of Patent: Feb. 28, 2012

(54) DATA NETWORK AND METHOD OF CONTROLLING THEREOF

(75) Inventor: Jerzy Piotr Walczak, Sulejowek (PL)

(73) Assignee: ATM S.A., Warsaw (PL)

( * ) Notice: Subject to any disclaimer, the term of this patent is extended or adjusted under 35 U.S.C. 154(b) by 803 days.

(21) Appl. No.: 12/166,894

(22) Filed: Jul. 2, 2008

(65) Prior Publication Data

US 2009/0193269 A1 Jul. 30, 2009

(30) Foreign Application Priority Data

Jan. 26, 2008 (PL) .......................... 384328

(51) Int. Cl.
*G06F 1/00* (2006.01)
*G06F 1/26* (2006.01)
*G06F 1/32* (2006.01)
*G06F 15/16* (2006.01)
*G06F 11/16* (2006.01)

(52) U.S. Cl. ........ 713/324; 713/300; 713/320; 709/217; 709/219; 714/4.11

(58) Field of Classification Search .................. 713/300, 713/310, 320, 323–324; 710/74, 260, 262; 709/217, 219; 714/4.11
See application file for complete search history.

(56) References Cited

U.S. PATENT DOCUMENTS

| 5,938,771 A * | 8/1999 | Williams et al. ............... 713/310 |
| 2003/0041201 A1* | 2/2003 | Rauscher ....................... 710/300 |
| 2003/0135654 A1* | 7/2003 | Chang ........................... 709/250 |
| 2004/0111558 A1* | 6/2004 | Kistler et al. .................. 711/114 |
| 2004/0230848 A1* | 11/2004 | Mayo et al. ................... 713/320 |
| 2005/0210304 A1* | 9/2005 | Hartung et al. ............... 713/320 |

FOREIGN PATENT DOCUMENTS

EP 2083537 A1 * 7/2009

OTHER PUBLICATIONS

Xue, Zhenghua, et al. "An energy-efficient management mechanism for large-scale server clusters". Asia-Pacific Service Computing Conference, The 2nd IEEE. Dec. 11-14, 2007. pp. 509-516.*
"Secure method to power-on SAN controller nodes belonging to a cluster (Wake on Fibre)". IBM. IP.com Journal. IP.com, Inc. Jan. 19, 2004. IP.com No. IPCOM000021444D.*
"Hierarchical system-level power management policy for high-density web/volume clusters". IP.com Journal. IP.com, Inc. Aug. 15, 2001. IP.com No. IPCOM000005126D.*
Christensen, Kenneth, et al. "The next fronntier for communciations networks: power management". Computer Communications. Elsevier Science Publishers BV. vol. 27, No. 18. Dec. 1, 2004. pp. 1758-1770. XP004594843. ISSN: 0140-3664.*

* cited by examiner

*Primary Examiner* — Thomas J Cleary
(74) *Attorney, Agent, or Firm* — Seed IP Law Group PLLC

(57) ABSTRACT

A data network that includes a plurality of nodes for storing data and a plurality of control units adapted to control at least one of the nodes in which individual nodes are powered-up when the assigned control unit receives a request from a client to access the data stored in the node.

18 Claims, 4 Drawing Sheets

DATA NETWORK AND METHOD OF CONTROLLING THEREOF

BACKGROUND

1. Technical Field

The present disclosure relates to data networks providing access to data storage in general and, in particular, to optimization of power consumption by network nodes operating as data storage.

2. Description of the Related Art

Media, such as audio recordings and films, can nowadays be effectively archived in digital format, and it is used by private persons and by large organizations. In the case of large organizations the number of records (i.e., individual audio or video recordings) can be very large. Additionally, the size of digitized media files, especially video files converted to high quality digital format, is large, and in consequence archives of media files require large memory space. The digitized media can be stored on various media, e.g., CD-ROM, DVD, Blue Ray, HD DVD, hard disks, magnetic tapes, and others.

For large organizations using hard disks for storing media data is very useful as it does not require any manual or mechanical operations to be performed in order to access the files stored on that drive, and as a result it can be accessed from a remote location (e.g., a branch of this organization) via a network (e.g., intranet or Internet).

The problem faced by some organizations is that the number of media files is growing very fast, and the old files cannot be simply deleted because, for example, they are classified as part of national heritage and as such must be archived indefinitely. This results in a constantly expanding archive. The problem of available memory space can be solved by connecting additional hard disk drives to the existing ones.

While the solution with a plurality of hard disk drives may provide adequate space for storing the media files, it also requires a substantial amount of electricity to run. Power consumption of a storage system comprised of 10,000 hard disks, each consuming 25 W is 250 kW. By reducing power consumption of such a system, significant financial benefits can be gained, and additionally its impact on the environment will be reduced.

BRIEF SUMMARY

The embodiments of the present disclosure to obviate at least some of the above disadvantages and provide an improved data network and method of optimization of power consumption by a node for storing data in the data network.

Accordingly, the disclosed embodiments seek to preferably mitigate, alleviate or eliminate one or more of the disadvantages mentioned above singly or in any combination.

According to a first aspect of the present disclosure there is provided a data network having a plurality of nodes for storing data and a plurality of control units, wherein each of the control units is adapted to control at least one of the nodes and an individual node is powered-up when its assigned control unit receives a request from a client to access data stored in the node.

According to a second aspect of the present disclosure there is provided a method of optimizing power consumption in a data network having a plurality of nodes for storing data and a plurality of control units, wherein each of the control units controls at least one of the nodes, the method including powering-up of an individual node in response to a request from a client to access data stored in the node received by its assigned control unit.

According to a third aspect of the present disclosure there is provided a network element connected to a data network, the element including a control unit and at least one node for storing data, wherein the control unit is adapted to control the at least one nodes and the node is powered-up when the control unit receives a request from a client to access data stored in the node.

In accordance with another embodiment of the present disclosure, a circuit is provided that includes a plurality of nodes adapted to store data and a plurality of control units, each control unit coupled to at least two nodes of the plurality of nodes and adapted to control operation of the at least two nodes, including powering on the at least two nodes in response to a request to access data, and the control unit further configured to limit the number of nodes of the at least two nodes that are powered on to control the amount of power consumed by the at least two nodes.

In accordance with another aspect of the foregoing embodiment, each of the at least two nodes includes a control circuit, the control circuit adapted to automatically power off the respective node after either transfer of requested data to a client is completed, or after receipt of acknowledgement that the requested data received by a client is error free, or after completing an ordered operation.

In accordance with another aspect of the foregoing embodiment, the control unit is configured to switch off at least one of the at least two nodes when the control unit detects that at least one of the at least two nodes is not active for a period of time or when the control unit detects that at least one node of the at least two nodes is performing undefined operations caused by an error in performing a defined task.

In accordance with another aspect of the foregoing embodiment, the circuit includes an interface for accessing data stored in the at least two nodes and a look-up table listing data files and their locations in the at least two nodes, the circuit further comprising a selection circuit cooperating with the interface wherein if a data file is stored in more than one node and one of those nodes is active, the selection circuit is adapted to define the active node as a default node for accessing the data file.

In accordance with another aspect of the foregoing embodiment, the selection circuit is adapted to determine if there is any active node in the at least two nodes, and if the requested data is stored in any of the active nodes, to grant access to the requested data in the active node, the selection means adapted to check non-active nodes of the at least two nodes for the presence of requested data only if the requested data is not stored in any active nodes of the at least two nodes.

Further features of the present disclosure are as claimed in the dependent claims.

The present disclosure provides the benefit of significantly reduced power consumption with preserved scalability of the system. Additionally, the solution is not affected by changes in data formats used for storing the media files or changes in technology used in the storing devices (e.g., disks), which makes it specifically designed for long term media archives.

BRIEF DESCRIPTION OF THE SEVERAL VIEWS OF THE DRAWINGS

The present disclosure will be understood and appreciated more fully from the following detailed description taken in conjunction with the accompanying drawings in which.

DETAILED DESCRIPTION

The present disclosure is based on the fact that media files, even if compressed, are usually large and their transfer from a storage device to a local drive of a client is relatively long when compared to the time required to power-up a network node working as a storage. Therefore, the increase of time necessary to download the media file related to powering-up the node is small and even negligibly small in the case of very large files.

Figure 1:
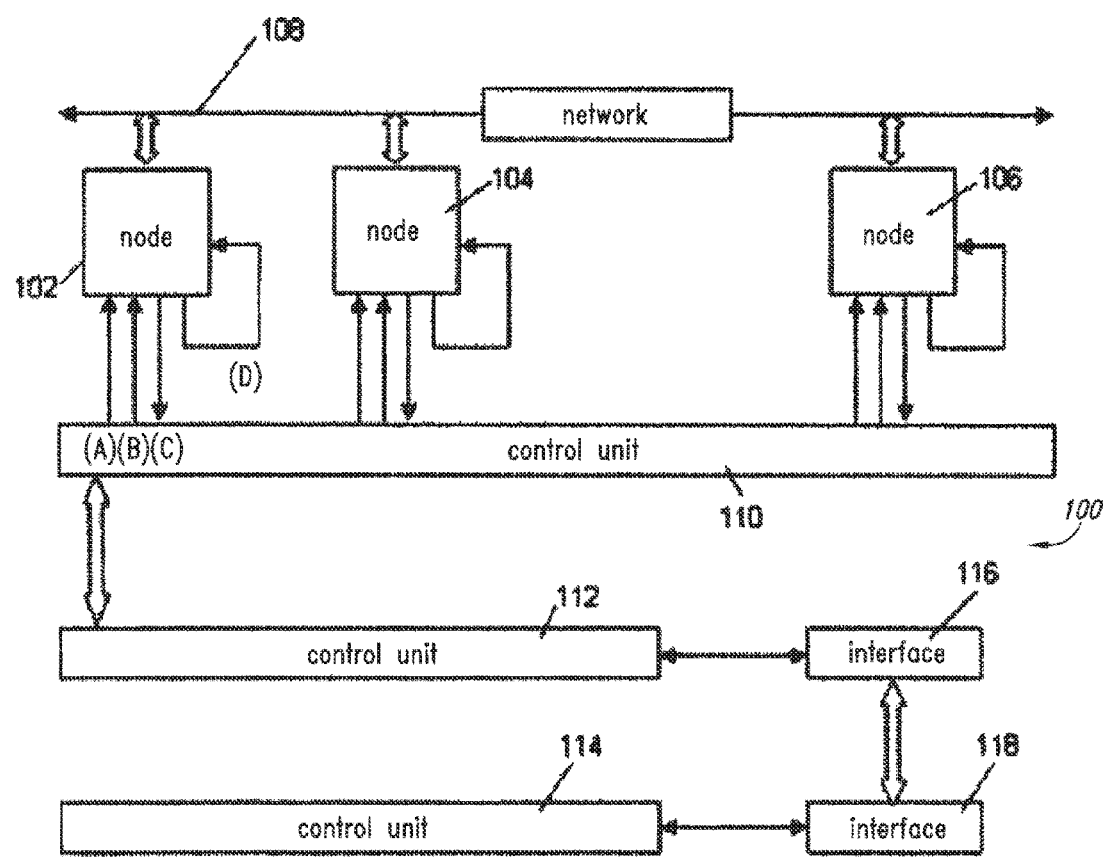
FIG. 1 is a diagram illustrating a data network in one embodiment of the present disclosure.
Figure 4:
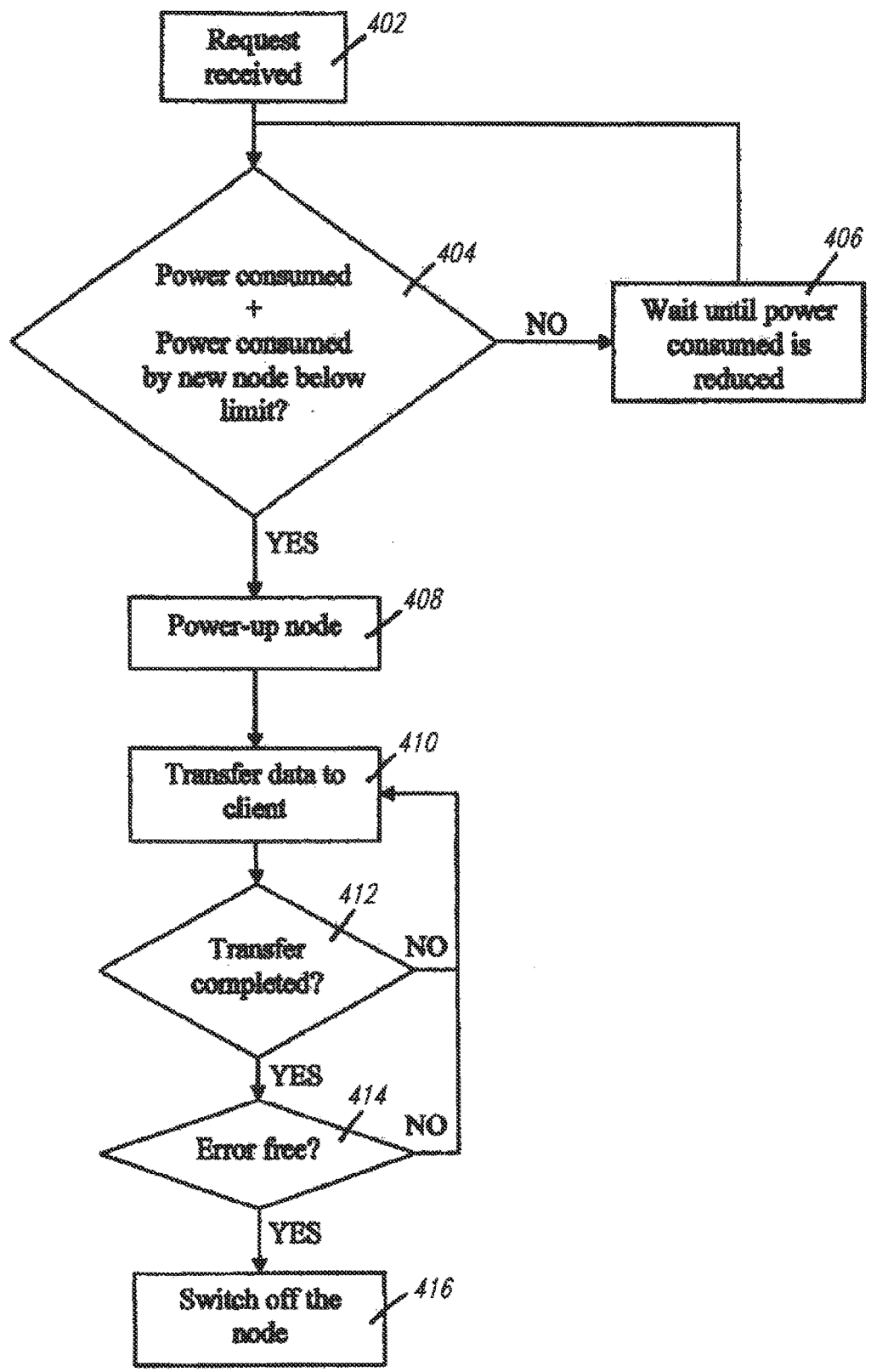
FIG. 4 is a flow-chart illustrating a method of optimizing power consumption in a data network in one embodiment of the present disclosure.

With reference to FIG. 1 and FIG. 4 a method of optimization of power consumption in a data network 100 is presented. In one embodiment the data network 100 includes a plurality of nodes 102, 104, and 106. The nodes are used for storing data, especially media files, i.e., audio and video recordings converted to digital formats. The network 100 also includes a plurality of control units 110, 112, and 114. The control units 110, 112, and 114 are connected to the nodes in a way that each one of the control units controls at least one of the nodes 102, 104, and 106. If a request to access data stored in a particular node, e.g., node 102, is received 402 by the control unit 100 controlling this node, the node is powered-up 408 by an instruction from the control unit 110. The request to access data is made, for example, by a client from a computer (laptop or desktop) connected to the network 108, either by wire or wirelessly.

Preferably the control unit 110 limits the number of active nodes 406 (i.e., nodes providing access to data stored on them) in a way that power consumed by the active nodes does not exceed 404 a predetermined value. Since power consumption of the whole network is paramount here, this solution ensures that a group of nodes 102, 104, and 106 controlled by one control unit 110 does not consume more energy that it is allowed. The level of power consumed can be changed, if necessary, by an administrator of the network. The predetermined value of the level of allowed power consumption is preferably determined experimentally in day-to-day use.

If the number of active nodes controlled by one control unit 110 is such that the summarized current power consumption and the power consumption of another node would exceed, 404, the limit, the client requesting access to data has to wait, 406, until the power consumed by the currently active nodes is reduced, which in most cases means that one of the nodes is switched-off after the transfer is completed. The power consumed may also be reduced by changing the operation performed by one or more of the active nodes (e.g., from providing access to data to performing some low power consuming maintenance operations).

Once the node is powered-up (or booted-up), the requested data is transferred to the client, 410. In one embodiment after the transfer is completed, 412, and there is no other transfer pending from that node, the node is switched-off, 416, and the control unit is notified of switching off the node. Also, the node may be switched off after completing another ordered operation, e.g., deleting a file or a maintenance operation relating to testing and restoring the values of physical parameters of recording or possible additional ordered service performed by the node software. These operations may be ordered, for example, by a control unit or by the network administrator.

In a preferred embodiment, however, it is checked if the data received by the client is error free, 414. If there is no error in the received file, the node is switched-off, 416. The node receives the notification of the fact that the data is error free and of the switch-off order from the control unit. The step of determining if the received file is error-free is carried out using one of the techniques known in the art, e.g., CRC (or Cyclic Redundancy Check).

In an alternative embodiment the control unit periodically checks the status of each controlled node and switches-off a node if it detects that the node is not active for a predetermined period of time. In another embodiment the control unit 110, additionally, switches-off a node in case it detects the node performing undefined operations caused by an error in performing a defined task.

In a preferred embodiment optimization of power consumption is also performed at the level of the whole network. When a client requests access to a file stored in the network, it is first checked if there is any active node in the network and if the requested data is stored in any of the active nodes. If it is confirmed, the client is granted access to the requested data stored in the node. Conversely, checking the non-active nodes for the presence of the requested data is carried out only if the requested data is not stored in any of the active nodes.

Preferably a group of nodes 102, 104, and 106 controlled by one control unit 110 use one power supply unit. Using one power supply requires that the nodes 102, 104, and 106 are in the same location.

In order to facilitate access to the resources stored in the nodes 102, 104, and 106, the network includes an interface for accessing the data stored in the nodes and a look-up table listing the data files and their locations. The interface and the table is separated from the nodes in a way that it is not required for the node to be active to know what is stored in the node. The table of contents of all nodes in the network is updated regularly so it is possible to find if and where a requested file is stored and only then, when a request is sent and received, the node is activated.

In another embodiment the network 100 includes a table of occupancy of the nodes and their locations. As in the previous embodiment, the table makes it possible to access the data stored in the nodes.

Also preferably the network includes a selection means or selection circuit cooperating with the interface, wherein if a data file is stored in more than one node and one of these nodes is active, the selection means is adapted to define the active node as a default node for accessing the data file. It is also possible that the selection means has characteristics of the individual nodes, and if the requested file is stored in more than one node, then if all the nodes having the selected file are not active, the selection means selects the node which is the most energy efficient amongst all the nodes having that file.

In a preferred embodiment the selection means is realized by an index or an order queue server (external objects). In such a case a file and its copy are treated as separate files, while the administration node only answers the index whether any node comprising the file or its copy is active. The decision of selecting the node to be made available is made by the index, queue server or another external object.

Figure 3:
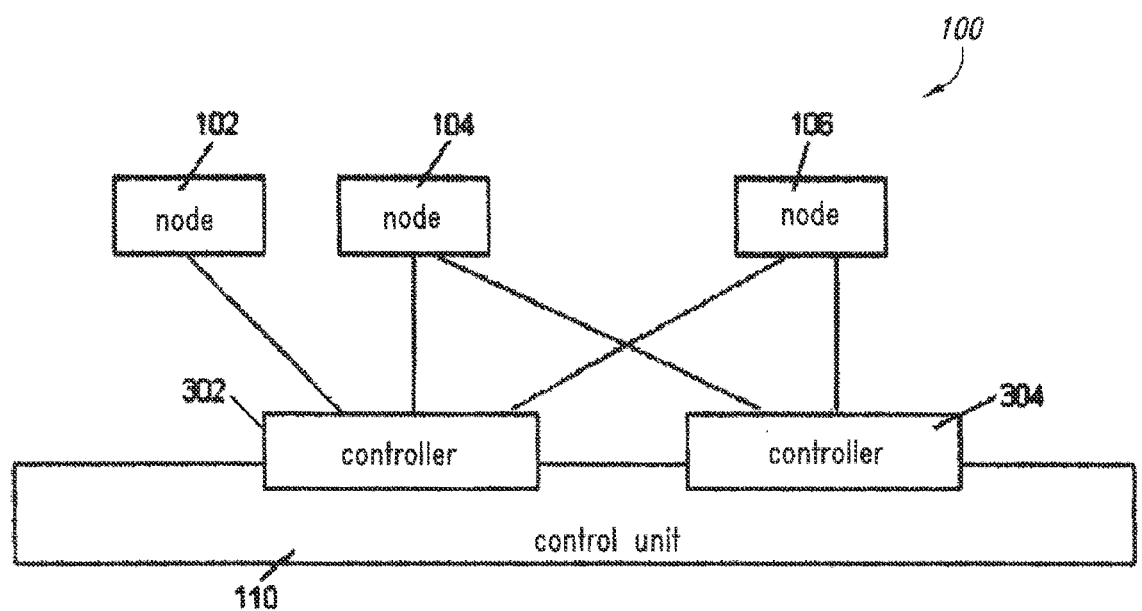
FIG. 3 is a diagram illustrating a data network in one embodiment of the present disclosure.

In a preferred embodiment of the data network 100, illustrated in FIG. 3, the control unit 110 includes a plurality of controllers 302, 304, which carry out the operations of controlling the nodes assigned to the control unit 110. An individual controller 302, apart from controlling its assigned node 104, is configured as a back-up controller for nodes of its neighbor controllers 304 in the case of failure of the neighbor controller 304. In a preferred embodiment the controller 302 is physically (e.g., by means of cables) connected to three nodes: its "own" node 104, and two nodes of its neighbors: 102 and 104.

In operation, the control units 110, 112, and 114 control the assigned nodes 102, 104, and 106 by sending unmasked interrupt signals to the assigned nodes.

As an emergency feature a control unit 110-114 can switch-off an active node. This may be required, for example, when the active nodes controlled by the control unit increase significantly their power consumption by starting to carry out power demanding tasks.

Figure 2:
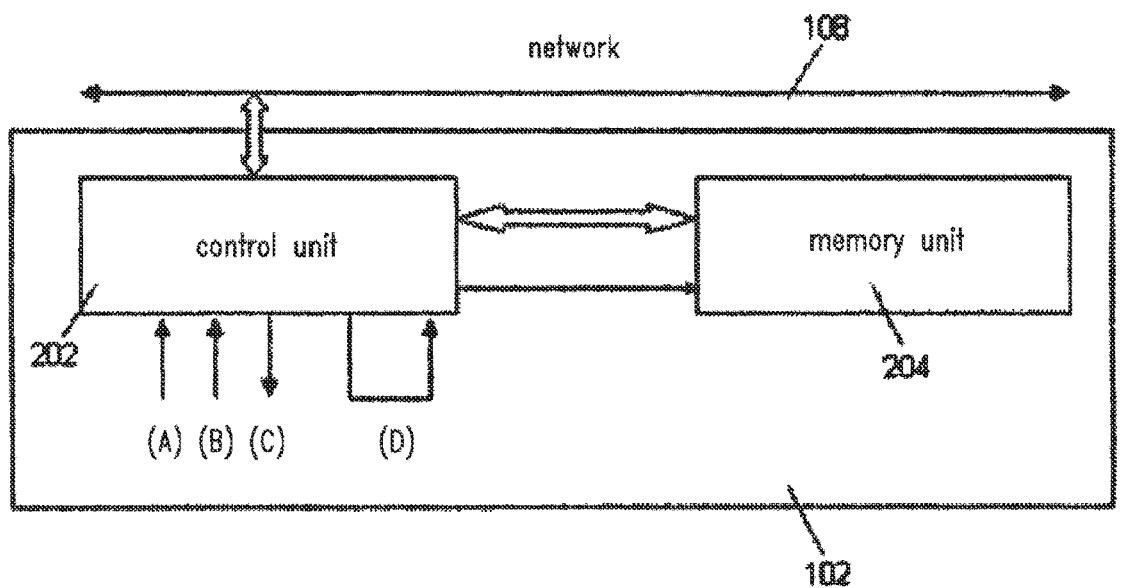
FIG. 2 is a diagram illustrating a node of the data network in one embodiment of the present disclosure.

With reference to FIG. 2 a network node 102 for use in a data network 100 is presented. The node 102 includes a control section or control unit 202 and at least one memory unit 204 for storing data. The control unit 202 controls the at least one memory unit 204. The node is powered-up when the control unit 202 receives a request from a client to access the data stored in the node.

In one embodiment the control unit 202 is realized in the technology called Wake-On-Lan (WOL), which allows remotely activate switched-off control section 202. The control signal for activating the WOL-type control section 202 is received by an Ethernet network card integral or connected to the WOL control section 202. In this situation all elements of the node apart from the Ethernet card can be fully switched-off. In this embodiment the node is identified by the IP address of the Ethernet card. In alternative embodiments, however, other types of control sections can be used.

The control section 202 performs the following processes: A—activation of internal elements (e.g., memory) of the node; B—service functions (e.g., termination of the activity of a node if the time period granted for performing an ordered task is exceeded, checking the termination of the activity of a node if an ordered task was to be ended with its deactivation, starting the node restart operation by a selected neighbor node); C—process of monitoring the status of the node; D—process of switching off the elements of the node.

In one embodiment of the present disclosure the node includes a Serial ATA (SATA) hard disk as a memory unit 204. In alternative embodiments, however, it is possible to use multiple hard disks, not necessarily SATA type but for example IDE type drives.

In one embodiment the control unit 110 includes a plurality of single-chip CMOS microcontrollers 302, 304 with the input and output buffers connected, and a static memory, the contents of which is maintained after switching-off the power. The microcontroller 302, 304 is adapted to switch-on and switch-off the node, restarting the node, checking if the node is active or not active via a serial interface RS-232, and monitoring if the supply voltage is within predetermined limits. As was mentioned before, in the case of failure of a controller (microcontroller), its neighbor takes over the control of the assigned node. Therefore, if a node is active, then its microcontroller 302 and two neighbor microcontrollers are also active. One of the neighbor microcontrollers has address n−1 and the other neighbor microcontroller has address n+1, wherein the microcontroller assigned to the active node has the address n.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A data network with optimized power consumption, comprising: a plurality of nodes structured to store data and a plurality of control units connected to said plurality of nodes, each of said plurality of control units structured to control at least one of said plurality of nodes, wherein at least one of said plurality of control units comprises a plurality of controllers and each of said plurality of controllers is connected to a respective assigned node of said plurality of nodes and configured to control said assigned node, and each of said plurality of controllers is also connected to at least one neighbor node of said plurality of nodes, which is controlled by an assigned neighbor controller of said plurality of controllers, and configured to control said neighbor node in case of failure of said neighbor controller, thus acting as a back-up controller for said at least one neighbor controller, and wherein each of said plurality of nodes is adapted to automatically power-up when at least one of said plurality of controllers of at least one of said plurality of control units receives from a client a request to access data stored in said at least one of said plurality of nodes and adapted to automatically power-off after transfer of requested data to said client is completed or after an ordered operation performed by at least one of said plurality of nodes is completed.

2. The network according to claim 1 wherein said plurality of nodes controlled by one of said plurality of control units use one power supply unit and that one control unit is adapted to limit a number of active nodes in a way that the power consumed by said active nodes does not exceed a value, which value is determined experimentally in day-to-day use.

3. The network according to claim 1 further comprising an interface structured to access data stored in said plurality of nodes and to access a look-up table listing data files and their locations, said interface and said look-up table structured to be separated from said plurality of nodes.

4. The network according to claim 3 it further comprising a selection circuit structured to cooperate with said interface, wherein if a data file is stored in more than one of said plurality of nodes and one of these nodes is active, said selection circuit is adapted to define said active node as a default node for accessing said data file.

5. The network according to claim 4 wherein said selection circuit is adapted to check if there is any active node of said plurality of nodes in said data network and if said requested data is stored in any of said active nodes, and to grant access to said requested data if it is stored in said active node.

6. The network according to claim 4 wherein said selection circuit is adapted to check non-active nodes of said plurality of nodes for the presence of said requested data only if said requested data is not stored in any of said active nodes of said plurality of nodes.

7. The network according to claim 1 it further comprising a table structured to list the occupancy of said plurality of nodes and their locations.

8. The network according to claim 1 wherein at least one of said plurality of control units is adapted to switch-off an active node and switch-on a non-active node of said plurality of nodes being controlled by said control unit.

9. The network according to claim 1 wherein said plurality of control units is adapted to control said plurality of nodes by sending unmasked interrupt signals to said plurality of nodes.

10. A network node for use in a data network as defined in claim 1, said node comprising a control section and at least one memory unit for storing data, wherein said control section is connected to said data network and to said at least one memory unit, said control unit structured to control said at least one memory unit, and power up said network node when said control section receives a request from a client to access said data stored in said network node.

11. The network node according to claim 10 wherein it is further adapted to automatically switch-off after the transfer of said requested data to said client is completed.

12. A method of optimizing power consumption in a data network having a plurality of nodes structured to store data and a plurality of control units connected to said plurality of nodes, wherein each of said plurality of control units is assigned to control at least one of said plurality of nodes, and wherein at least one of said control units comprises a plurality of controllers and each of said plurality of controllers is connected to a respective assigned node of said plurality of nodes and configured to control said assigned node, and each of said plurality of controllers is also connected to at least one neighbor node of said plurality of nodes, which is controlled by its assigned neighbor controller of said plurality of controllers, the method comprising: automatic powering-up of at least one of said plurality of nodes in response to a request from a client to access data stored in said node received by its assigned controller of said plurality of controllers of one of said plurality of control units, and in case of failure of said assigned controller, by said assigned neighbor controller of said plurality of controllers of the same control unit; and automatic powering-off said at least one of said plurality of nodes after transfer of said requested data to said client is completed or after an ordered operation performed by at least one of said plurality nodes is completed.

13. The method according to claim 12, further comprising checking power consumption of active nodes controlled by a single control unit of said plurality of control units and limiting the number of said active nodes in a way that power consumed by said active nodes does not exceed a value, which value is determined experimentally in day-to-day use.

14. The method according to claim 12, further comprising checking if there is any active node of said plurality of nodes in said data network and if said requested data is stored in any of said active nodes, granting access to said requested data stored in said active node.

15. The method according to claim 14, further comprising checking non-active nodes of said plurality of nodes for the presence of said requested data only if said requested data is not stored in any of said active nodes.

16. A circuit, comprising: a plurality of nodes adapted to store data and a plurality of control units, each control unit coupled to at least two nodes of said plurality of nodes and adapted to control operation of said at least two nodes, including powering-on said at least two nodes in response to a request to access data, each control unit of the plurality of control units further configured to limit a number of nodes of said at least two nodes that are powered-on to control the amount of power consumed by said at least two nodes, wherein at least one of said plurality of control units comprises a plurality of controllers and each of said plurality of controllers is connected to a respective assigned node of said plurality of nodes and configured to control said assigned node, and each of said plurality of controllers is also connected to at least one neighbor node of said plurality of nodes, which is controlled by an assigned neighbor controller of said plurality of controllers, and configured to control said neighbor node in case of failure of said neighbor controller, thus acting as a back-up controller for said at least one neighbor controller, and wherein each of said plurality of nodes is adapted to automatically power-up when at least one of said plurality of controllers of at least one of said plurality of control units receives from a client a request to access data stored in said at least one of said plurality of nodes and adapted to automatically power-off after transfer of requested data to said client is completed or after an ordered operation performed by at least one of said plurality of nodes is completed.

17. The circuit of claim 16, further comprising an interface for accessing data stored in said at least two nodes of said plurality of nodes and a look-up table listing data files and their locations in said at least two nodes, said circuit further comprising a selection circuit cooperating with said interface, wherein if a data file is stored in more than one of said at least two nodes and one of those nodes is active, said selection circuit is adapted to define said active node as a default node for accessing said data file.

18. The circuit of claim 17 wherein said selection circuit is adapted to determine if there is any active node of said at least two nodes, and if said requested data is stored in any of said active nodes, to grant access to said requested data in said active node, and said selection means is further adapted to check non-active nodes of said at least two nodes for the presence of said requested data only if said requested data is not stored in any of said active nodes of said at least two nodes.

* * * * *